(12) United States Patent
Wang

(10) Patent No.: US 11,671,601 B2
(45) Date of Patent: Jun. 6, 2023

(54) VERSATILE VIDEO CODING TRACK CODING

(71) Applicant: Lemon Inc., Grand Cayman (KY)

(72) Inventor: Ye-Kui Wang, San Diego, CA (US)

(73) Assignee: LEMON, INC., Grand Cayman (KY)

( * ) Notice: Subject to any disclaimer, the term of this patent is extended or adjusted under 35 U.S.C. 154(b) by 0 days.

(21) Appl. No.: 17/475,719

(22) Filed: Sep. 15, 2021

(65) Prior Publication Data

US 2022/0086430 A1 Mar. 17, 2022

Related U.S. Application Data

(60) Provisional application No. 63/079,869, filed on Sep. 17, 2020.

(51) Int. Cl.
*H04N 19/132* (2014.01)
*H04N 19/159* (2014.01)
(Continued)

(52) U.S. Cl.
CPC ......... *H04N 19/132* (2014.11); *H04N 19/105* (2014.11); *H04N 19/159* (2014.11);
(Continued)

(58) Field of Classification Search
CPC ............... H04N 19/132; H04N 19/105; H04N 19/159; H04N 19/172; H04N 19/188; H04N 19/513; H04N 21/23418; H04N 21/2343; H04N 21/236; H04N 21/434; H04N 21/85406; H04N 19/174; H04N 19/184;
(Continued)

(56) References Cited

U.S. PATENT DOCUMENTS 8,275,051 B2 9/2012 Hannuksela et al.
8,365,060 B2 1/2013 Wang et al.
(Continued)

FOREIGN PATENT DOCUMENTS

CN 105900401 A 8/2016
CN 113056911 A 6/2021
(Continued)

OTHER PUBLICATIONS

Le Feuvre et al. "Dynamic Independent ROIs in VVC File Format," 129 MPEG Meeting Jan. 13-17, 2020, Brussels, Motion Picture Expert Group[or ISO/IECJTC1/SC29AWG11,nom52355,Jan. 8, 2020,retrieved from the internet Jan. 8, 2020. (Year: 2020).*
(Continued)

*Primary Examiner* — Hesham K Abouzahra
(74) *Attorney, Agent, or Firm* — Perkins Coie LLP

(57) ABSTRACT

Systems, methods and apparatus for encoding or decoding a file format that stores one or more images are described. One example method includes performing a conversion between a visual media file and a bitstream of a visual media data according to a format rule, where the format rule specifies a condition that controls whether an information item is included in a non-video coding layer track of the visual media file, and where a presence of the non-video coding layer track in the visual media file is indicated by a specific track reference in a video coding layer track of the visual media file.

20 Claims, 9 Drawing Sheets

(51) Int. Cl.
　　　*H04N 19/169*　　(2014.01)
　　　*H04N 19/513*　　(2014.01)
　　　*H04N 21/234*　　(2011.01)
　　　*H04N 21/2343*　(2011.01)
　　　*H04N 19/105*　　(2014.01)
　　　*H04N 19/172*　　(2014.01)
(52) U.S. Cl.
　　　CPC ......... *H04N 19/172* (2014.11); *H04N 19/188* (2014.11); *H04N 19/513* (2014.11); *H04N 21/2343* (2013.01); *H04N 21/23418* (2013.01)
(58) Field of Classification Search
　　　CPC ...... H04N 19/70; H04N 19/30; H04N 19/423; H04N 19/44
　　　See application file for complete search history.

(56) References Cited

U.S. PATENT DOCUMENTS

| | | | |
|---|---|---|---|
| 8,774,284 | B2 | 7/2014 | Wang et al. |
| 9,357,199 | B2 | 5/2016 | Wang et al. |
| 9,584,792 | B2 | 2/2017 | Wang et al. |
| 9,621,919 | B2 | 4/2017 | Wang et al. |
| 9,648,299 | B2 | 5/2017 | Wang et al. |
| 9,648,348 | B2 | 5/2017 | Wang et al. |
| 9,712,843 | B2 | 7/2017 | Wang et al. |
| 9,936,128 | B2 | 4/2018 | Chaaroui et al. |
| 10,034,010 | B2 | 7/2018 | Hendry et al. |
| 10,129,527 | B2 | 11/2018 | Zhang |
| 10,306,253 | B2 | 5/2019 | Wang et al. |
| 10,397,472 | B2 | 8/2019 | Chaaroui et al. |
| 10,623,755 | B2 | 4/2020 | Wang |
| 10,652,630 | B2 | 5/2020 | Wang |
| 10,791,315 | B2 | 9/2020 | Wang et al. |
| 10,805,650 | B2 | 10/2020 | Wang et al. |
| 10,873,736 | B2 | 12/2020 | Wang et al. |
| 2016/0330255 | A1 | 11/2016 | Denoual et al. |
| 2016/0373771 | A1 | 12/2016 | Hendry et al. |
| 2017/0111642 | A1 | 4/2017 | Hendry et al. |
| 2018/0103199 | A1 | 4/2018 | Hendry et al. |
| 2018/0199075 | A1 | 7/2018 | Wang et al. |
| 2019/0014162 | A1 | 1/2019 | Denoual et al. |
| 2019/0306519 | A1 | 10/2019 | Chen et al. |
| 2020/0154116 | A1 | 5/2020 | Wang |
| 2020/0336726 | A1 | 10/2020 | Wang et al. |
| 2021/0014515 | A1 | 1/2021 | Hu et al. |
| 2022/0086446 | A1 | 3/2022 | Wang et al. |
| 2022/0109848 | A1 | 4/2022 | Wang et al. |

FOREIGN PATENT DOCUMENTS

| | | |
|---|---|---|
| CN | 114189694 A | 3/2022 |
| EP | 3713234 A1 | 9/2020 |
| GB | 2522014 A | 7/2015 |
| JP | 2015511437 A | 4/2015 |
| JP | 2017508334 A | 3/2017 |
| JP | 2018511208 A | 4/2018 |
| JP | 2018524891 A | 8/2018 |
| JP | 2022524354 A | 5/2022 |
| KR | 20160105793 A | 9/2016 |
| KR | 20210080533 A | 6/2021 |
| KR | 20220034931 A | 3/2022 |
| WO | 2015104303 A2 | 7/2015 |
| WO | 2016002496 A1 | 1/2016 |
| WO | 2020176636 A1 | 9/2020 |
| WO | 2020179713 A1 | 9/2020 |
| WO | 2020097232 A1 | 5/2022 |

OTHER PUBLICATIONS

Text of ISO/IEC 14496-15: 2019 DAM2 Carriage of VVC and EVC in ISOBMFF, 131 MPEG Meeting, Jun. 29 to Jul. 3, 2020, Motion Picture Expert Group or ISO/IEC JTC1/SC29/WG11, No. n19454, Jul. 30, 2020 retrieved from the internet Jul. 30, 2020. (Year: 2020).*

Boyce et al. ""Versatile Supplemental Enhancement Information Messages for Coded Video Bitstreams (Draft 5),"" Joint Video Experts Team (JVET)of ITU-T SG 16 WP 3 and ISO/IEC JTC 1/SC 29/WG 1118th Meeting: by teleconference, Apr. 15-24, 2020, document JVET-S2007, 2020.

Bross et al. ""Versatile Video Coding (Draft 10),"" Joint Video Experts Team (JVET)of ITU-T SG 16 WP 3 and ISO/IEC JTC 1/SC 29/WG 1119th Meeting: by teleconference, 22 Jun. 22-Jul. 1, 2020, document JVET-S2001, 2020.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

"Information Technology—High Efficiency Coding and Media Delivery in Heterogeneous Environments—Part 2: High Efficiency Video Coding" Apr. 20, 2018, ISO/DIS 23008, 4th Edition.

"Information Technology—Coded Representation of Immersive Media—Part 3: Versatile Video Coding" ISO/IEC JTC 1/SC 29 /WG 11 N 18692, Text of ISO/IEC CD 23090-3, ISO/IEC JTC 1/SC 29/WG 11, Jul. 12, 2019.

"Information Technology—Coding of Audio-Visual Objects—Part 15: Carriage of Network Abstraction Layer (NAL) Unit Structured Video in the ISO Base Media File Format—Amendment 2: Carriage of VVC and EVC in ISOBMFF" ISO/IEC 14496-15:2019(E) Amendment 2, ISO/IEC JTC 1/SC 29/WG 11, 2020, N19454.

"Information Technology—High Efficiency Coding and Media Delivery in Heterogeneous Environments—Part 12: Image File Format—Amendment 3: Support for VVC, EVC, Slideshows and Other Improvements," ISO/IEC 23008-12:2017(E) Amendment 3, ISO/IEC JTC1/SC 29/WG 11, 2020. N19460.

"Versatile Supplemental Enhancement Information Messages for Coded Video Bitstreams," Series H: Audiovisual and Multimedia Systems: Infrastructure of Audiovisual Services—Coding of Moving Video, ITU-T Telecommunication Standardization Sector of ITU, H.274, Aug. 2020.

Le Feuvre et al. "Dynamic Independent ROIs in VVC File Format," 129 MPEG Meeting Jan. 13-17, 2020, Brussels, Motion Picture Expert Group[ or ISO/IEC JTC 1/SC 29/WG 11, No. m52355, Jan. 8, 2020, retrieved from the internet Jan. 8, 2020.

"Potential Improvement on Carriage of VVC and EVC in ISOBMFF," 132 MPEG Meeting, Oct. 12-16, 2020, Motion Picture Expert Group or ISO/IEC JTC1/SC29/WG11, No. n19715, Nov. 19, 2020, retrieved from the internet Nov. 19, 2020.

Sanchez et al. "DCI Support in File Format," 131 MPEG Meeting Jun. 29 to Jul. 3, 2020, ISO/IEC JTC1/SC 29/WG11 MPEG 2020, m54443, Jun. 2020, retrieved from the internet Jun. 29, 2020.

SC 29 Secretariat: "Summary of Voting on ISO/IEC 14496-15:2019/ CD AMD 2," 131, MPEG Meeting, Jun. 29 to Jul. 3, 2020, Motion Picture Expert Group or ISO/IEC JTC1/SC/29/WG11, No. m54125, Jun. 27, 2020, retrieved from the internet Jun. 27, 2020.

"Text of ISO/IEC 14496-15: 2019 DAM 2 Carriage of VVC and EVC in ISOBMFF," 131 MPEG Meeting, Jun. 29 to Jul. 3, 2020, Motion Picture Expert Group or ISO/IEC JTC1/SC29/WG11, No. n19454, Jul. 30, 2020 retrieved from the internet Jul. 30, 2020.

Wang et al. "On VVC File Format," 127 MPEG Meeting, Jul. 8-12, 2019, Gothenburg, Motion Picture Expert Group or ISO/IEC JTC1/ SC 29/WG 11, No. m48079, May 20, 2019, retrieved from the internet May 20, 2019.

Wang, Ye-Kui, "Storage of PH, APS, DCI and OPI NAL Units," 132 MPEG Meeting, Oct. 12-16, 2020, Motion Picture Expert Group or ISO/IEC JTC1/SC29/WG11, No. m55176, Oct. 6, 2020, retrieved from the internet Oct. 6, 2020.

Wang, Ye-Kui, "Storage of PH, APS, DCI and OPI NAL Units," 132 MPEG Meeting, Oct. 12-16, 2020, Motion Picture Expert Group or ISO/IEC JTC1/SC29/WG11, No. m55176, Oct. 7, 2020, retrieved from the internet Oct. 7, 2020.

"WD of ISO/IEC 14496—15:2019 AMD 2 Carriage of VVC in ISOBMFF," 129 MPEG Meeting, Jan. 13-17, 2020, Brussels, Motion Picture Expert Group or ISO/IEC JTC 1/SC 29 WG 11, No. n19049, Apr. 3, 2020, retrieved from the Internet Apr. 3, 2020.

(56) References Cited

OTHER PUBLICATIONS

Extended European Search Report from European Patent Application No. 21197206.2 dated Feb. 16, 2022 (11 pages).
Extended European Search Report from European Patent Application No. 21197208.8 dated Feb. 16, 2022 (8 pages).
Extended European Search Report from European Patent Application No. 21199819.0 dated Feb. 22, 2022 (10 pages).
Notice of Allowance from U.S. Appl. No. 17/475,826 dated Oct. 13, 2022.
Examination Report from Indian Patent Application No. 202144042198 dated May 4, 2022, (6 pages).

* cited by examiner

VERSATILE VIDEO CODING TRACK CODING

CROSS REFERENCE TO RELATED APPLICATIONS

Under the applicable patent law and/or rules pursuant to the Paris Convention, this application is made to timely claim the priority to and benefits of U.S. Provisional Patent Application No. 63/079,869, filed on Sep. 17, 2020. For all purposes under the law, the entire disclosure of the aforementioned application is incorporated by reference as part of the disclosure of this application.

TECHNICAL FIELD

This patent document relates to generation, storage and consumption of digital audio video media information in a file format.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders for processing coded representation of a video or an image according to a file format.

In one example aspect, a video processing method is disclosed. The method includes performing a conversion between a visual media file and a bitstream of a visual media data according to a format rule, where the format rule specifies a condition that controls whether an information item is included in a non-video coding layer track of the visual media file, and where a presence of the non-video coding layer track in the visual media file is indicated by a specific track reference in a video coding layer track of the visual media file.

In another example aspect, a video processing method is disclosed. The method includes performing a conversion between a visual media file and a bitstream of a visual media data according to a format rule, where the format rule specifies that a type of a sample entry determines whether decoding capability information network abstraction layer units are included in either the sample entry of a video track in the visual media file or in a sample of the video track and the sample entry of the video track in the visual media file.

In another example aspect, a video processing method is disclosed. The method includes performing a conversion between a visual media data and a file that stores information corresponding to the visual media data according to a format rule; wherein the format rule specifies a first condition for identifying a non-video coding layer (VCL) track of the file and/or a second condition for identifying a VCL track of the file.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclose. The code embodies one of the methods described herein in the form of processor-executable code.

In yet another example aspect, a computer readable medium having a bitstream stored thereon is disclosed. The bitstream is generated or processed using a method described in the present document.

These, and other, features are described throughout the present document.

DETAILED DESCRIPTION

Figure 1:
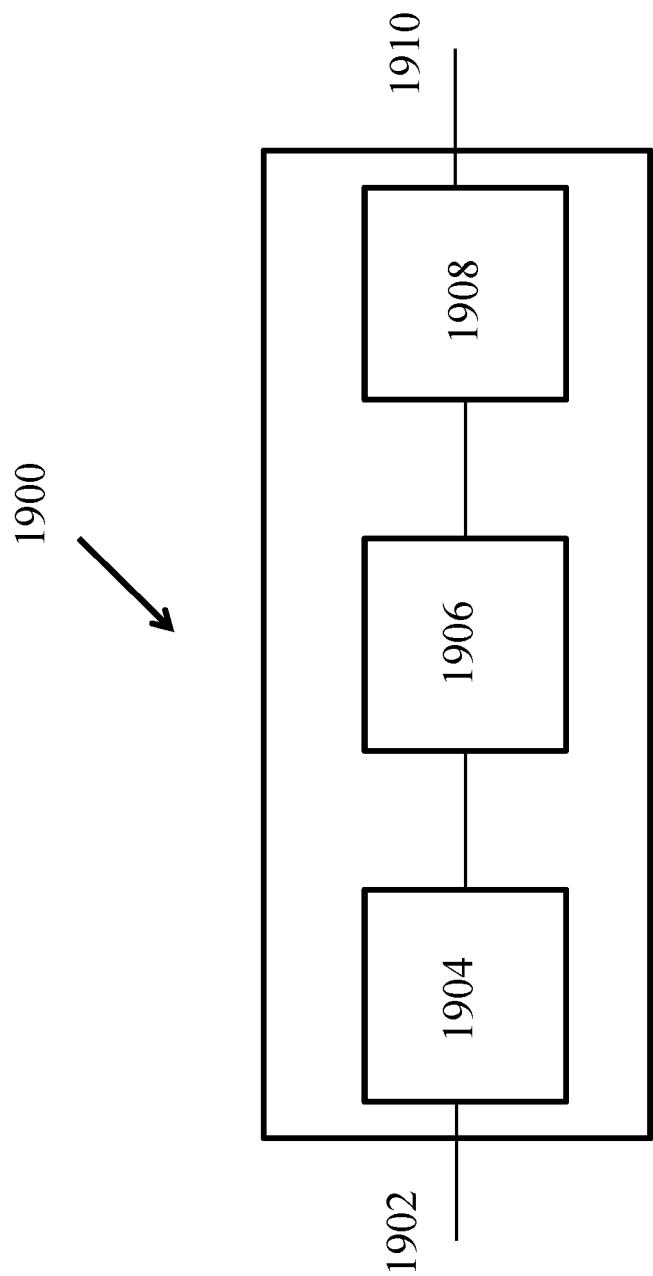
FIG. 1 is a block diagram of an example video processing system.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also. In the present document, editing changes are shown to text by open and close double brackets (e.g., [[ ]]) which indicates that the text in between the double brackets is cancelled text, and by boldface italic text indicating added text, with respect to the current draft of the VVC specification or ISOBMFF file format specification.

1. Brief Discussion

This document is related to video file format. Specifically, it is related to signalling and storage of picture header (PH), adaptation parameter set (APS), decoding capability information (DCI), and operating point information (OPI) network abstraction layer (NAL) units of Versatile Video Coding (VVC) video bitstreams in a media file based on the ISO base media file format (ISOBMFF). The ideas may be applied individually or in various combination, for video bitstreams coded by any codec, e.g., the VVC standard, and for any video file format, e.g., the VVC video file format being developed.

2. Abbreviations

ACT adaptive colour transform
ALF adaptive loop filter

AMVR adaptive motion vector resolution
APS adaptation parameter set
AU access unit
AUD access unit delimiter
AVC advanced video coding (Rec. ITU-T H.264|ISO/IEC 14496-10)
B bi-predictive
BCW bi-prediction with CU-level weights
BDOF bi-directional optical flow
BDPCM block-based delta pulse code modulation
BP buffering period
CABAC context-based adaptive binary arithmetic coding
CB coding block
CBR constant bit rate
CCALF cross-component adaptive loop filter
CPB coded picture buffer
CRA clean random access
CRC cyclic redundancy check
CTB coding tree block
CTU coding tree unit
CU coding unit
CVS coded video sequence
DPB decoded picture buffer
DCI decoding capability information
DRAP dependent random access point
DU decoding unit
DUI decoding unit information
EG exponential-Golomb
EGk k-th order exponential-Golomb
EOB end of bitstream
EOS end of sequence
FD filler data
FIFO first-in, first-out
FL fixed-length
GBR green, blue, and red
GCI general constraints information
GDR gradual decoding refresh
GPM geometric partitioning mode
HEVC high efficiency video coding (Rec. ITU-T H.265|ISO/IEC 23008-2)
HRD hypothetical reference decoder
HSS hypothetical stream scheduler
I intra
IBC intra block copy
IDR instantaneous decoding refresh
ILRP inter-layer reference picture
IRAP intra random access point
LFNST low frequency non-separable transform
LPS least probable symbol
LSB least significant bit
LTRP long-term reference picture
LMCS luma mapping with chroma scaling
MIP matrix-based intra prediction
MPS most probable symbol
MSB most significant bit
MTS multiple transform selection
MVP motion vector prediction
NAL network abstraction layer
OLS output layer set
OP operation point
OPI operating point information
P predictive
PH picture header
POC picture order count
PPS picture parameter set
PROF prediction refinement with optical flow
PT picture timing
PU picture unit
QP quantization parameter
RADL random access decodable leading (picture)
RASL random access skipped leading (picture)
RBSP raw byte sequence payload
RGB red, green, and blue
RPL reference picture list
SAO sample adaptive offset
SAR sample aspect ratio
SEI supplemental enhancement information
SH slice header
SLI subpicture level information
SODB string of data bits
SPS sequence parameter set
STRP short-term reference picture
STSA step-wise temporal sublayer access
TR truncated rice
VBR variable bit rate
VCL video coding layer
VPS video parameter set
VSEI versatile supplemental enhancement information (Rec. ITU-T H.274|ISO/IEC 23002-7)
VUI video usability information
VVC versatile video coding (Rec. ITU-T H.266|ISO/IEC 23090-3)

3. Video Coding Introduction

3.1. Video Coding Standards

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by VCEG and MPEG jointly in 2015. Since then, many new methods have been adopted by JVET and put into the reference software named Joint Exploration Model (JEM). The JVET was later renamed to be the Joint Video Experts Team (JVET) when the Versatile Video Coding (VVC) project officially started. VVC is the new coding standard, targeting at 50% bitrate reduction as compared to HEVC, that has been finalized by the JVET at its 19th meeting ended at Jul. 1, 2020.

The Versatile Video Coding (VVC) standard (ITU-T H.266|ISO/IEC 23090-3) and the associated Versatile Supplemental Enhancement Information (VSEI) standard (ITU-T H.274|ISO/IEC 23002-7) have been designed for use in a maximally broad range of applications, including both the traditional uses such as television broadcast, video conferencing, or playback from storage media, and also newer and more advanced use cases such as adaptive bit rate streaming, video region extraction, composition and merging of content from multiple coded video bitstreams, multiview video, scalable layered coding, and viewport-adaptive 360° immersive media.

3.2. File Format Standards

Media streaming applications are typically based on the IP, TCP, and HTTP transport methods, and typically rely on a file format such as the ISO base media file format (ISOBMFF). One such streaming system is dynamic adaptive streaming over HTTP (DASH). For using a video format with ISOBMFF and DASH, a file format specification specific to the video format, such as the AVC file format and the HEVC file format, would be needed for encapsulation of the video content in ISOBMFF tracks and in DASH representations and segments. Important information about the video bitstreams, e.g., the profile, tier, and level, and many others, would need to be exposed as file format level metadata and/or DASH media presentation description (MPD) for content selection purposes, e.g., for selection of appropriate media segments both for initialization at the beginning of a streaming session and for stream adaptation during the streaming session.

Similarly, for using an image format with ISOBMFF, a file format specification specific to the image format, such as the AVC image file format and the HEVC image file format, would be needed.

The VVC video file format, the file format for storage of VVC video content based on ISOBMFF, is currently being developed by MPEG.

The VVC image file format, the file format for storage of image content coded using VVC, based on ISOBMFF, is currently being developed by MPEG.

3.3. PH, APS, DCI and OPI NAL Units in VVC

Some new types of NAL units have been introduced into VVC, including PH, APS, DCI, and OPI NAL units.

3.3.1. Adaptation Parameter Set (APS)

Adaptation parameter set (APS) conveys picture- and/or slice-level information that may be shared by multiple slices of a picture, and/or by slices of different pictures, but can change frequently across pictures and the total number of variants can be high thus not suitable for inclusion into the PPS. Three types of parameters are included in APSs: adaptive loop filter (ALF) parameters, luma mapping with chroma scaling (LMCS) parameters, and scaling list parameters. APSs can be carried in two distinct NAL unit types either preceding or succeeding the associated slices as a prefix or suffix. The latter can help in ultralow-delay scenarios, e.g., allowing an encoder to send the slices of a picture before generating ALF parameters, based on the picture, that are to be used by subsequent pictures in decoding order.

3.3.2. Picture Header (PH)

A picture header (PH) structure is present for each PU. A PH is present either in a separate PH NAL unit or included in the slice header (SH). The PH can only be included in the SH if the PU consists of only one slice. To simplify the design, within a CLVS, PHs can only be either all in PH NAL units or all in SHs. When the PHs are in the SHs, there is no PH NAL unit in the CLVS.

PH is designed for two objectives. First, to help reduce signaling overhead of SHs for pictures containing multiple slices per picture, by carrying all parameters that have the same value for all slices of a picture, thus not repeating the same parameters in each SH. These include IRAP/GDR picture indications, inter/intra slices allowed flags, and information related to POC, RPL, deblocking filter, SAO, ALF, LMCS, scaling lists, QP delta, weighted prediction, coding block partitioning, virtual boundaries, the collocated picture, etc. Second, to help the decoder to identify the first slice of each coded picture containing multiple slices. Since one and only one PH is present for each PU, thus when the decoder receives a PH NAL unit, it easily knows that the next VCL NAL unit is the first slice of a picture.

3.3.3. Decoding Capability Information (DCI)

The DCI NAL unit contains bitstream-level PTL information. The DCI NAL unit includes one or more PTL syntax structures that can be used during session negotiation between sender and receiver of a VVC bitstream. When the DCI NAL unit is present in a VVC bitstream, each output layer set (OLS) in the CVSs of the bitstream shall conform to the PTL information carried in least one of the PTL structures in the DCI NAL unit.

In AVC and HEVC, the PTL information for session negotiation is available in the SPS (for HEVC and AVC) and in the VPS (for HEVC layered extension). This design of conveying the PTL information for session negotiation in HEVC and AVC has disadvantages because the scope of SPS and VPS is within a CVS, instead of the whole bitstream. Because of that, sender-receiver session initiation may suffer from re-initiation during bitstream streaming at every new CVS. DCI solves this problem since it carries bitstream-level information, thus, the compliance to the indicated decoding capability can be guaranteed until the end of the bitstream.

3.3.4. Operating Point Information (OPI)

The decoding processes of HEVC and VVC have similar input variables to set the decoding operating point, i.e., the target OLS and the highest sublayer of the bitstream to be decoded, through a decoder API. However, in scenarios where layers and/or sublayers of the bitstream are removed during transmission or a device does not expose the decoder API to the application, it could occur that a decoder cannot be correctly informed about the operating point for decoder to process the given bitstream. Hence, the decoder may not be able to conclude on the properties of pictures in the bitstream, e.g., proper buffer allocation for decoded pictures as well as whether individual pictures are output or not. In order to address this issue, VVC adds a mode of indicating these two variables within the bitstream through the newly introduced operating point information (OPI) NAL unit. In the AUs at the beginning of the bitstream and its individual CVSs, the OPI NAL unit informs the decoder about the target OLS and the highest sublayer of the bitstream to be decoded.

In the case when the OPI NAL unit is present and the operating point is also provided to the decoder via decoder API information (e.g., the application may have more updated information about the target OLS and sublayer), the decoder API information takes precedence. In absence of both a decoder API and any OPI NAL unit in the bitstream, suitable fallback choices are specified in VVC to allow proper decoder operation.

3.4. Some Specifics of VVC Video File Format

3.4.1. Types of Tracks

The VVC video file format specifies the following types of video tracks for carriage of VVC bitstreams in ISOBMFF files:

a) VVC track:
  A VVC track represents a VVC bitstream by including NAL units in its samples and sample entries and possibly by referencing other VVC tracks containing other sublayers of the VVC bitstream and possibly by referencing VVC subpicture tracks. When a VVC track references VVC subpicture tracks, it is referred to as a VVC base track.
b) VVC non-VCL track:
  APSs, which carry ALF, LMCS, or scaling list parameters, and other non-VCL NAL units can be stored in and transmitted through a track that is separate from the track containing the VCL NAL units; this is the VVC non-VCL track.
c) VVC subpicture track:
  A VVC subpicture track contains either of the following:
    A sequence of one or more VVC subpictures.
    A sequence of one or more complete slices forming a rectangular area.
  A sample of a VVC subpicture track contains either of the following:
    One or more complete subpictures as specified in ISO/IEC 23090-3 that are contiguous in decoding order.
    One or more complete slices as specified in ISO/IEC 23090-3 that form a rectangular area and are contiguous in decoding order.
  The VVC subpictures or slices included in any sample of a VVC subpicture track are contiguous in decoding order.
    NOTE: VVC non-VCL tracks and VVC subpicture tracks enable an optimal delivery of VVC video in streaming applications as follows. These tracks can each be carried in DASH representations of their own, and for decoding and rendering of a subset of the tracks, the DASH representations containing the subset of the VVC subpicture tracks as well as the DASH representation containing the non-VCL tracks can be requested by the client, segment by segment. This way, redundant transmission of APSs and other non-VCL NAL units can be avoided.

3.4.2. VVC Elementary Stream Structure

Three types of elementary streams are defined for storing VVC content:
  Video elementary stream that does not contain any parameter sets; all parameter sets are stored in a sample entry or sample entries;
  Video and parameter set elementary stream that may contain parameter sets, and may also have parameter sets stored in their sample entry or sample entries;
  Non-VCL elementary stream that contains non-VCL NAL units synchronized with the elementary stream carried in the video track.
    NOTE: A VVC non-VCL track does not contain parameter set in its sample entries.

3.4.3. Decoder Configuration Information Sample Group

3.4.3.1. Definition

A sample group description entry of this sample group contains a DCI NAL unit. All samples mapped to the same Decoder Configuration Information sample group description entry belong to the same VVC bitstream.

This sample group indicates whether the same DCI NAL units is used for different sample entries in a VVC track, i.e. whether samples belonging to different sample entries belong to the same VVC bitstream. When samples of two sample entries are mapped to the same Decoder Configuration Information sample group description entry, a player can switch sample entries without re-initialization of the decoder.

If any DCI NAL unit is present in any sample entry or inband, it shall be exactly the same as the DCI NAL unit included in the Decoder Configuration Information sample group.

3.4.3.2. Syntax

```
class DecoderConfigurationInformation extends VisualSampleGroupEntry ('dcfi') {
    unsigned int(16) dciNalUnitLength;
    bit(8*nalUnitLength) dciNalUnit;
}
```

3.4.3.3. Semantics dciNalUnitLength indicates the length in bytes of the DCI NAL unit.
dciNalUnit contains a DCI NAL unit as specified in ISO/IEC 23090-3.

4. Example Technical Problems Solved by Disclosed Technical Solutions

The latest designs of the VVC video file format regarding the signalling of PH, APS, DCI, and OPI NAL units have the following problems:
1) Both VVC base track and VVC non-VCL track shall not contain VCL NAL units. However, the current definition of VVC non-VCL track would also apply to a VVC base track. Furthermore, per the current definition, a VVC non-VCL track always contains APS NAL units. However, that would disallow a non-VCL NAL unit to contain picture header NAL units and possibly other non-VCL NAL units, but excluding APS NAL units.
  Allowing such a VVC non-VCL track would enable optimal storage of extractable-subpictures-based single-layer bitstreams in a file for late-banding of the subpicture tracks when different subpictures using different sets of APSs, e.g., by having one PH track (as a non-VCL track, although it contains the same information as in a VVC base track), multiple APS tracks (as VVC non-VCL tracks), and multiple VVC subpicture tracks each containing a subpicture sequence.
2) APS NAL units are either all stored in one VVC non-VCL track or in a VVC track. In other words, APS NAL units cannot be stored in more than one track. This works for APS NAL units containing LMCS parameters (i.e., LMCS APSs) or APS NAL units containing scaling list (SL) parameters (i.e., SL APSs), but is not ideal for APS NAL units containing ALF parameters (i.e., ALF APSs). Because different VVC subpicture tracks may use different sets of ALF APSs, it is desirable to enable multiple VVC non-VCL tracks to carry ALF APSs for a VVC bitstream.
3) DCI NAL units are not considered in the definitions of video elementary stream and video and parameter set elementary stream. Consequently, a video elementary stream does not contain parameter sets but may contain DCI NAL units.
4) The definition of non-VCL elementary stream does not exclude the possibility of containing VCL NAL units in a non-VCL elementary stream.
5) The decoder configuration information sample group provides a mechanism for signalling of DCI NAL units. However, the following issues exist:
   a. In the most common use cases, all samples of a track would belong to the same bitstream (or share the same DCI regardless of the number of bitstreams). For such cases, figuring out the applicable DCI through the sample group signalling is complicated.
   b. It is said that all samples mapped to the same Decoder Configuration Information sample group description entry belong to the same VVC bitstream. However, this disallows samples belonging to multiple VVC bitstreams (e.g., determined by EOB NAL units) but in the same track to share the same DCI NAL unit even when they can.
6) OPI NAL units are not allowed to be included in the sample entry description. However, in many cases OPI NAL units, when present in a VVC bitstream, should be treated similarly as parameter sets, thus they should be allowed to be included in the sample entry description.

5. Example Solutions and Embodiments

To solve the above problems, and others, methods as summarized below are disclosed. The items should be considered as examples to explain the general concepts and should not be interpreted in a narrow way. Furthermore, these items can be applied individually or combined in any manner.
1) To solve problems 1 and 2, one or more of the following items are proposed:
   a. A VVC non-VCL track is defined as a track that contains only non-VCL NAL units and is referred to by a VVC track through a 'vvcN' track reference.
   b. It is specified that a VVC non-VCL track may contain APSs, which carry ALF, LMCS, or scaling list parameters, with or without other non-VCL NAL units, stored in and transmitted through a track that is separate from the track containing the VCL NAL units.
   c. It is specified that a VVC non-VCL track may also contain picture header NAL units, with or without APS NAL units, and with or without other non-VCL NAL units, stored in and transmitted through a track that is separate from the track containing the VCL NAL units.
   d. It is specified that picture header NAL units for a video stream may be stored either in the samples of VVC tracks or in the samples of VVC non-VCL tracks, but not both at the same time.
2) To solve problem 3, one or more of the following items are proposed:
   a. Video elementary stream is defined as an elementary stream that contains VCL NAL units and does not contain any parameter set, DCI, or OPI NAL units; all parameter sets, DCI, and OPI NAL units are stored in sample entries.
      i. Alternatively, video elementary stream is defined as an elementary stream that contains VCL NAL units and does not contain any parameter set or DCI NAL units; all parameter set and DCI NAL units are stored in sample entries.
   b. Treat DCI NAL units exactly the same as parameter sets, i.e., DCI NAL units can be only in sample entries of a video track (e.g., when the sample entry type name is 'vvc1'), or can be in either or both of samples and sample entries of a video track (e.g., when the sample entry type name is 'vvi1').
3) To solve problem 4, it is specified that a non-VCL elementary stream is an elementary stream that contains non-VCL NAL units only and these non-VCL NAL units are synchronized with the elementary stream carried in the video track.
4) To solve problem 5, one or more of the following items are proposed:
   a. For cases wherein all samples of a track belong to the same bitstream (or share the same DCI regardless of the number of bitstreams), the DCI NAL unit may be signalled in a track level box, e.g., the track header box, a track-level meta box, or another track level box.
   b. Allow samples belonging to multiple VVC bitstreams (e.g., determined by EOB NAL units) but in the same track to belong to the same decoder configuration information sample group and consequently share the same Decoder Configuration Information sample group description entry.
5) To solve problem 6, OPI NAL units are allowed to be included in the sample entry description, e.g., as one of the non-VCL NAL unit arrays in the decoder configuration record.
   a. Alternatively, treat OPI NAL units exactly the same as parameter sets, i.e., OPI NAL units can be only in sample entries of a video track (e.g., when the sample entry type name is 'vvc1'), or can be in either or both of samples and sample entries of a video track (e.g., when the sample entry type name is 'vvi1').

6. Embodiments

Below are some example embodiments for some of the invention aspects summarized above in Section 5, which can be applied to the standard specification for VVC video file format. The changed texts are based on the latest draft specification. Most relevant parts that have been added or modified are indicated by *boldface italics text*, and some of the deleted parts are indicated by open and close double brackets (e.g., [[ ]] with the deleted text in between the double brackets indicating the deleted or cancelled text. There may be some other changes that are editorial in nature and thus not highlighted.

6.1. First Embodiment

This embodiment is for item 1.

6.1.1. Types of Tracks

This specification specifies the following types of video tracks for carriage of VVC bitstreams:
a) VVC track:
   A VVC track represents a VVC bitstream by including NAL units in its samples and/*or* sample entries, and possibly by *associating* other VVC tracks containing other *layers and/or* sublayers of the VVC bitstream *through the 'vopi' and 'linf'*
   *sample groups or through the*
   *'opeg' entity group,* and possibly by referencing VVC subpicture tracks.

When a VVC track references VVC subpicture tracks, it is also referred to as a VVC base track. *A VVC base track shall not contain VCL NAL units and shall not be referred to by a VVC track through a 'vvcN' track reference.* b) VVC non-VCL track:

*A VVC non-VCL track is a track that contains only non-VCL NAL units and is referred to by a VVC track through a 'vvcN' track reference.*

*A VVC non-VCL track may contain* APSs, which carry ALF, LMCS, or scaling list parameters, *with or without* other non-VCL NAL units, stored in and transmitted through a track that is separate from the track containing the VCL NAL units.

*A VVC non-VCL trac may also contain picture header NAL units, with or without APS NAL units, and with or without other non-VCL NAL units stored in and transmitted through a track that is separate from the track containing the VCL NAL units.* c) VVC subpicture track:

A VVC subpicture track contains either of the following:
A sequence of one or more VVC subpictures.
A sequence of one or more complete slices forming a rectangular area.

A sample of a VVC subpicture track contains either of the following:
One or more complete subpictures as specified in ISO/IEC 23090-3 that are contiguous in decoding order.
One or more complete slices as specified in ISO/IEC 23090-3 that form a rectangular area and are contiguous in decoding order.

The VVC subpictures or slices included in any sample of a VVC subpicture track are contiguous in decoding order.

NOTE: VVC non-VCL tracks and VVC subpicture tracks enable an optimal delivery of VVC video in streaming applications as follows. These tracks can each be carried in DASH representations of their own, and for decoding and rendering of a subset of the tracks, the DASH representations containing the subset of the VVC subpicture tracks as well as the DASH representation containing the non-VCL tracks can be requested by the client, segment by segment. This way, redundant transmission of APSs and other non-VCL NAL units can be avoided, *and transmission of unnecessary subpictures can also be avoided.*

6.2. Second Embodiment

This embodiment is for item 4.b.

6.2.1. Decoder Capability Information Sample Group

6.2.1.1. Definition

A sample group description entry of this sample group contains a DCI NAL unit.

This sample group indicates whether the same DCI NAL unit is used for different sample entries in a VVC track. When samples of two sample entries are mapped to the same Decoder Configuration Information sample group description entry, a player can switch sample entries without re-initialization of the decoder.

If any DCI NAL unit is present in any sample entry or inband, it shall be exactly the same as the DCI NAL unit included in the *corresponding* Decoder Configuration Information sample group entry.

6.2.1.2. Syntax

```
class DecoderConfigurationInformation extends VisualSampleGroupEntry
('dcfi') {
    unsigned int(16) dciNalUnitLength;
    bit(8*nalUnitLength) dciNalUnit;
}
```

6.2.1.3. Semantics dciNalUnitLength indicates the length in bytes of the DCI NAL unit.

dciNalUnit contains a DCI NAL unit as specified in ISO/IEC 23090-3.

6.3. Third Embodiment

This embodiment is for item 5.

6.3.1. Definition of VVC Decoder Configuration Record

This subclause specifies the decoder configuration information for ISO/IEC 23090-3 video content.

This record contains the size of the length field used in each sample to indicate the length of its contained NAL units as well as the parameter sets, DCI, OPI, and SEI NAL units, if stored in the sample entry. This record is externally framed (its size is supplied by the structure that contains it).

This record contains a version field. This version of the specification defines version 1 of this record. Incompatible changes to the record will be indicated by a change of version number. Readers shall not attempt to decode this record or the streams to which it applies if the version number is unrecognised.

Compatible extensions to this record will extend it and will not change the configuration version code. Readers should be prepared to ignore unrecognised data beyond the definition of the data they understand.

VvcPtlRecord shall be present in the decoder configuration record when the track contains a VVC bitstream natively or though resolving 'subp' track references, *and in this case the specific output layer set for the VVC bitstream is indicated by the field output_layer_set_idx.* If the ptl_present_flag is equal to zero in the decoder configuration record of a track then the track shall have an 'oref' track reference.

. . .

There is a set of arrays to carry initialization *non-VCL* NAL units. The NAL unit types are restricted to indicate DCI, *OPI,* VPS, SPS, PPS, prefix APS, and prefix SEI NAL units only. NAL unit types that are reserved in ISO/IEC 23090-3 and in this specification may acquire a definition in future, and readers should ignore arrays with reserved or unpermitted values of NAL unit type.

NOTE 2: This 'tolerant' behaviour is designed so that errors are not raised, allowing the possibility of backwards-compatible extensions to these arrays in future specifications.

NOTE 3: The NAL units carried in a sample entry are included immediately following the AUD and OPI NAL units (if any) in, or otherwise at the beginning of, the access unit reconstructed from the first sample that references the sample entry.

It is recommended that the arrays be in the order DCI, *OPI,* VPS, SPS, PPS, prefix APS, prefix SEI.

. . .

6.3.2. Semantics of VVC Decoder Configuration Record

. . .

numArrays indicates the number of arrays of NAL units of the indicated type(s).

array_completeness when equal to 1 indicates that all NAL units of the given type are in the following array and none are in the stream; when equal to 0 indicates that additional NAL units of the indicated type may be in the stream; the permitted values are constrained by the sample entry name.

NAL_unit_type indicates the type of the NAL units in the following array (which shall be all of that type); it takes a value as defined in ISO/IEC 23090-3; it is restricted to take one of the values indicating a DCI, *OPI,* VPS, SPS, PPS, *prefix* APS, *or* prefix SEI NAL unit.

numNalus indicates the number of NAL units of the indicated type included in the configuration record for the stream to which this configuration record applies. The SEI array shall only contain SEI messages of a 'declarative' nature, that is, those that provide information about the stream as a whole. An example of such an SEI could be a user-data SEI.

nalUnitLength indicates the length in bytes of the NAL unit.

nalUnit contains a DCI, *OPI,* VPS, SPS, PPS, APS or declarative SEI NAL unit, as specified in ISO/IEC 23090-3.

FIG. 1 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 2:
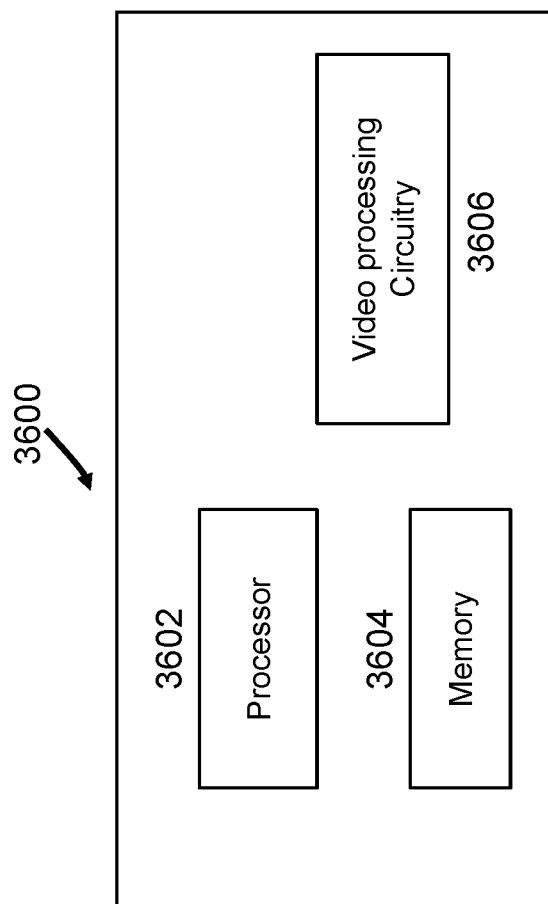
FIG. 2 is a block diagram of a video processing apparatus.

FIG. 2 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present document. The memory (memories) 3604 may be used for storing data and code used for implementing the methods and techniques described herein. The video processing hardware 3606 may be used to implement, in hardware circuitry, some techniques described in the present document. In some embodiments, the video processing hardware 3606 may be at least partly included in the processor 3602, e.g., a graphics co-processor.

Figure 4:
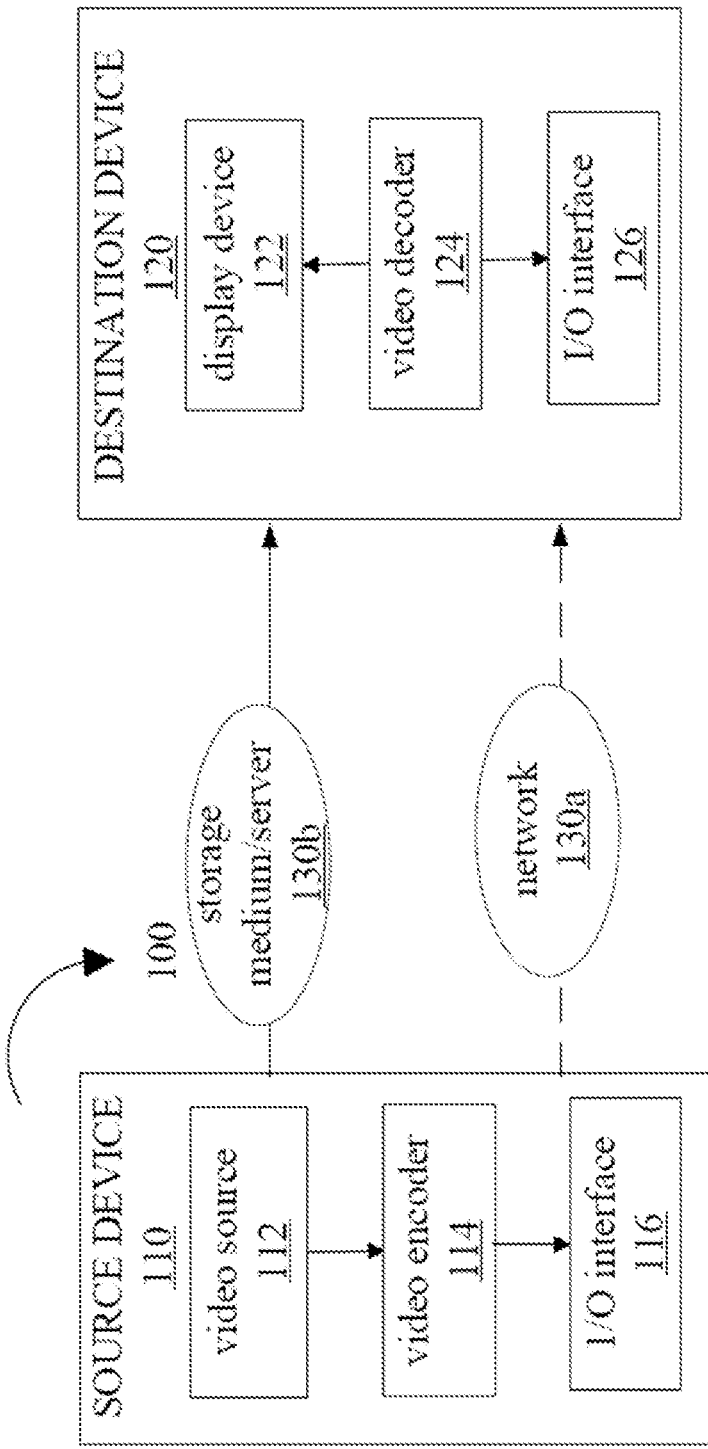
FIG. 4 is a block diagram that illustrates a video coding system in accordance with some embodiments of the present disclosure.

FIG. 4 is a block diagram that illustrates an example video coding system 100 that may utilize the techniques of this disclosure.

As shown in FIG. 4, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130*b* for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130*b*. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 5:
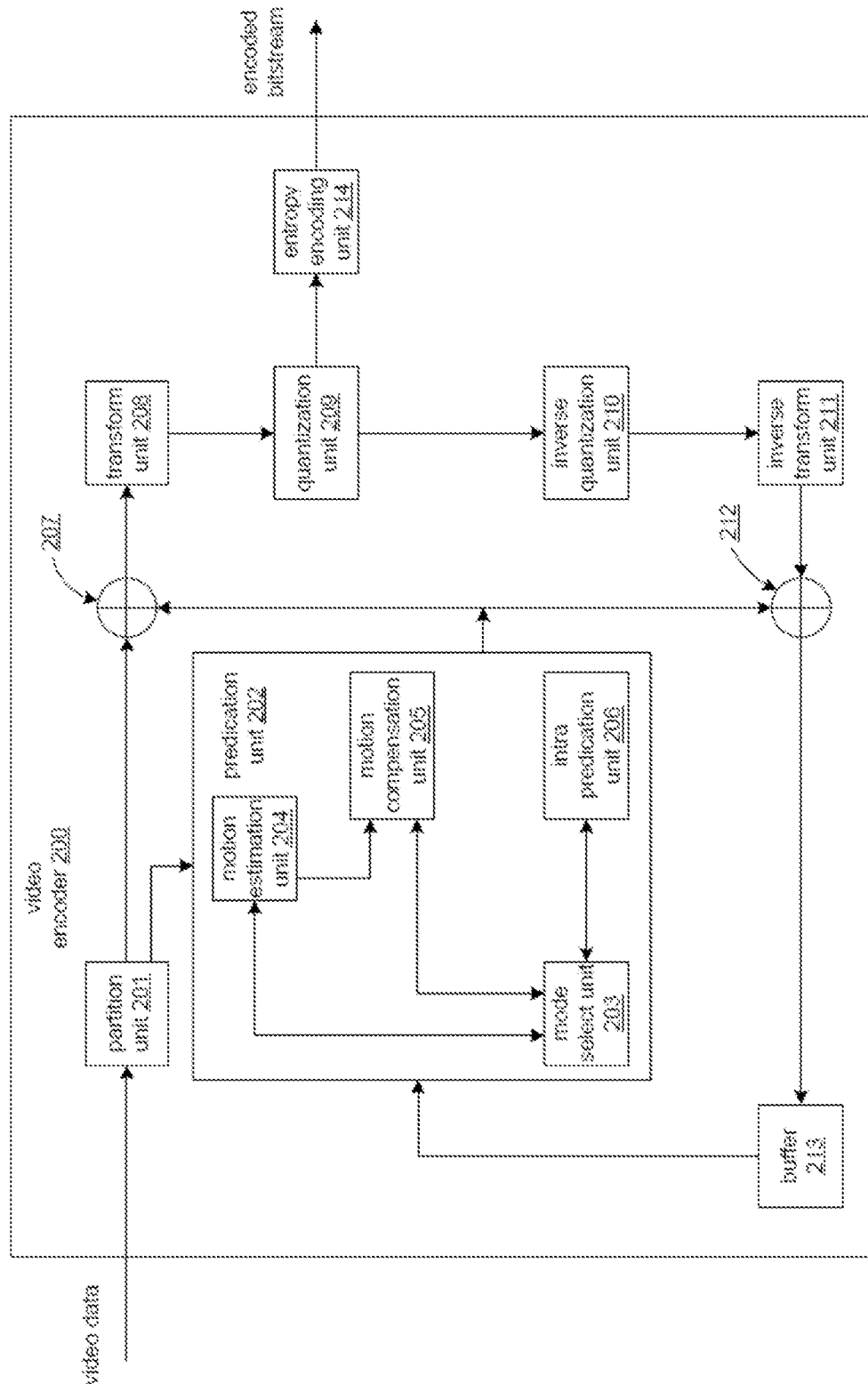
FIG. 5 is a block diagram that illustrates an encoder in accordance with some embodiments of the present disclosure.

FIG. 5 is a block diagram illustrating an example of video encoder 200, which may be video encoder 114 in the system 100 illustrated in FIG. 4.

Video encoder 200 may be configured to perform any or all of the techniques of this disclosure. In the example of FIG. 5, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 6:
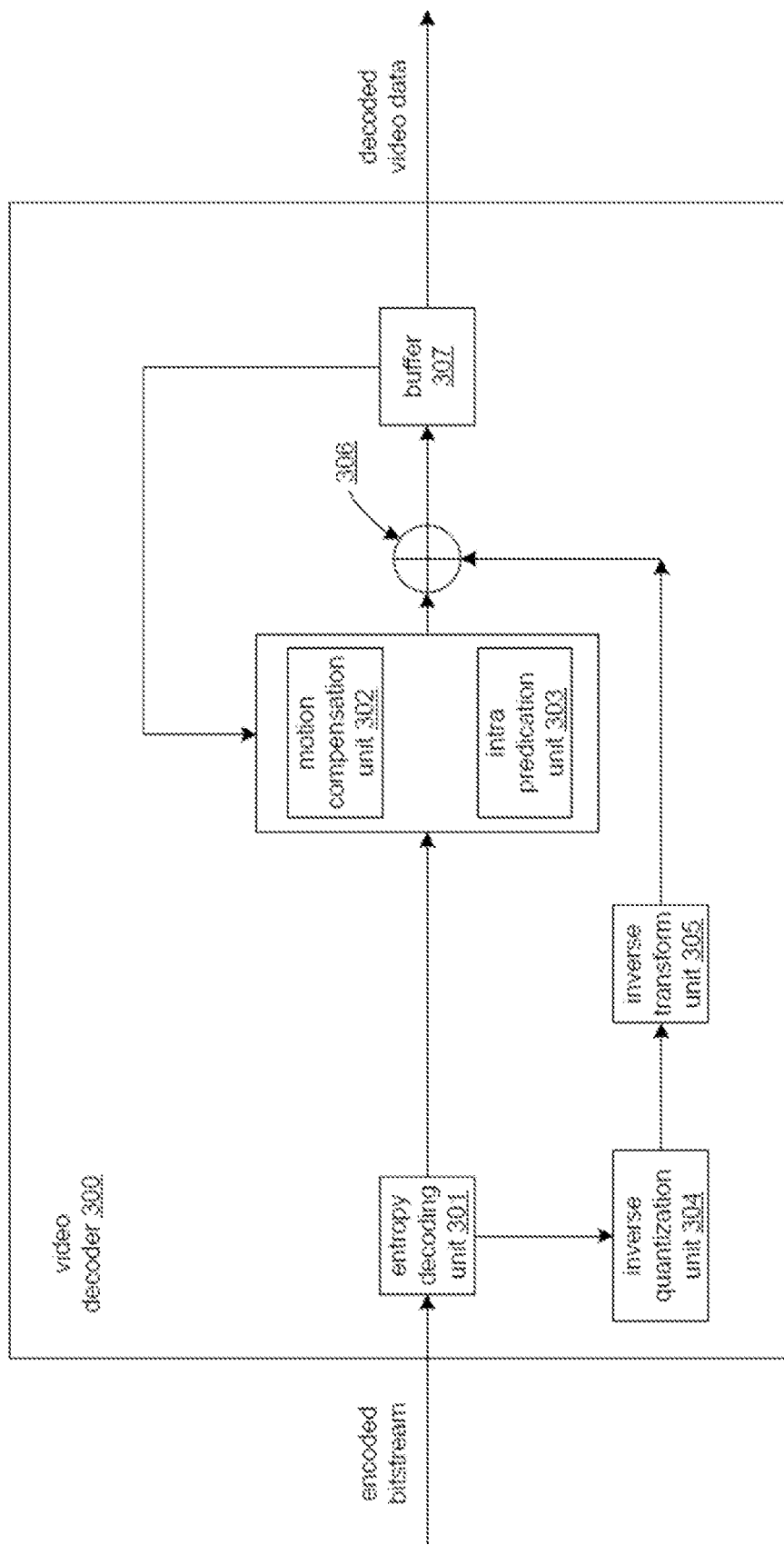
FIG. 6 is a block diagram that illustrates a decoder in accordance with some embodiments of the present disclosure.
Figure 7:
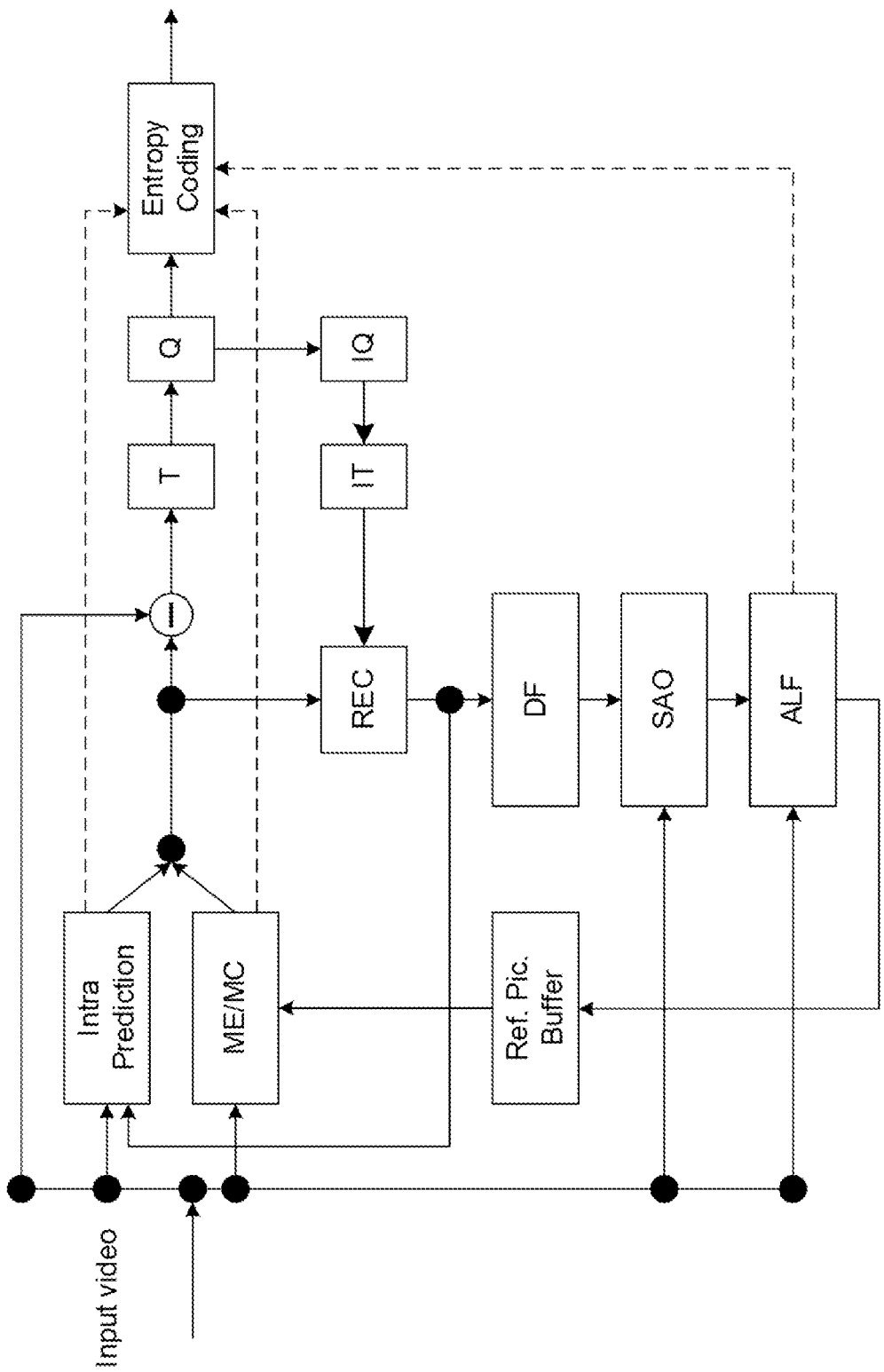
FIG. 7 shows an example of encoder block diagram.

FIG. 6 is a block diagram illustrating an example of video decoder 300 which may be video decoder 114 in the system 100 illustrated in FIG. 4.

The video decoder 300 may be configured to perform any or all of the techniques of this disclosure. In the example of FIG. 6, the video decoder 300 includes a plurality of functional components. The techniques described in this disclosure may be shared among the various components of the video decoder 300. In some examples, a processor may be configured to perform any or all of the techniques described in this disclosure.

In the example of FIG. 6, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 5).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

A listing of solutions preferred by some embodiments is provided next.

The following solutions show example embodiments of techniques discussed in the previous section (e.g., items 1 to 4).

Figure 3:
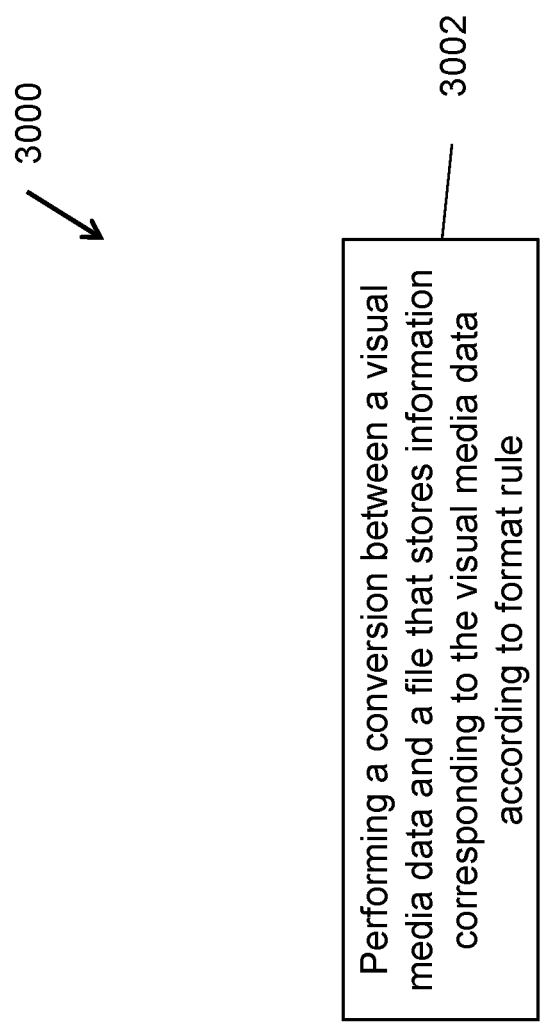
FIG. 3 is a flowchart for an example method of video processing.

1. A visual media processing method (e.g., method 3000 depicted in FIG. 3), comprising: performing (3002) a conversion between a visual media data and a file that stores information corresponding to the visual media data according to a format rule; wherein the format rule specifies a first condition for identifying a non-video coding layer (VCL) track of the file and/or a second condition for identifying a VCL track of the file.

2. The method of solution 1, wherein the first condition specifies that the non-VCL track contains only non-VCL network abstraction layer units and is identified in the VCL track through a specific track reference.

3. The method of solution 1-2, wherein the first condition specifies that the non-VCL track contains an adaptation parameter set (APS) corresponding to the VCL track.

4. The method of any of solutions 1-3, wherein the second condition for the VCL track specifies that the VCL track is disallowed to include decoding capability information (DCI) or operating point information (OPI) network abstraction units.

5. The method of solution 1, wherein the first condition specifies that the non-VCL track includes one or more elementary streams that contain non-VCL network abstraction layer units and wherein the non-VCL network abstraction layer units are synchronized with an elementary stream in the VCL track.

6. The method of any of solutions 1-5, wherein the conversion comprises generating a bitstream representation of the visual media data and storing the bitstream representation to the file according to the format rule.

7. The method of any of solutions 1-5, wherein the conversion comprises parsing the file according to the format rule to recover the visual media data.

8. A video decoding apparatus comprising a processor configured to implement a method recited in one or more of solutions 1 to 7.

9. A video encoding apparatus comprising a processor configured to implement a method recited in one or more of solutions 1 to 7.

10. A computer program product having computer code stored thereon, the code, when executed by a processor, causes the processor to implement a method recited in any of solutions 1 to 7.

11. A computer readable medium on which a bitstream representation complying to a file format that is generated according to any of solutions 1 to 7.

12. A method, apparatus or system described in the present document.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

Figure 8:
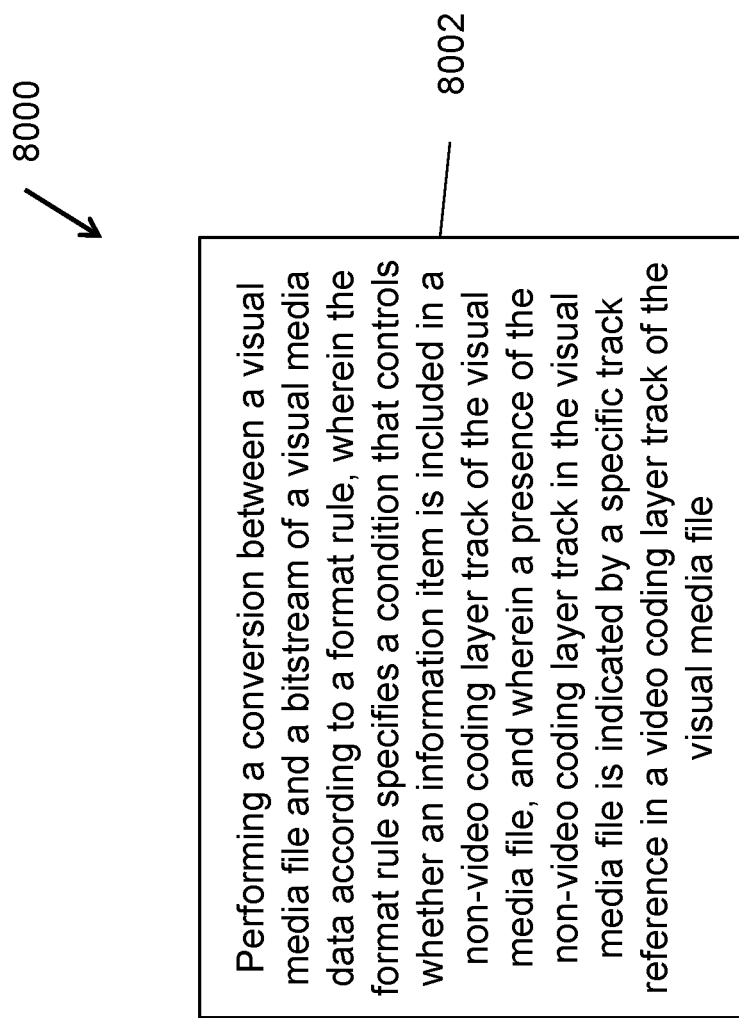
FIGS. 8 to 9 are flowcharts for example methods of video processing.

Technique 1. A method of processing visual media data (e.g., method 8000 depicted in FIG. 8), comprising: performing (8002) a conversion between a visual media file and a bitstream of a visual media data according to a format rule, wherein the format rule specifies a condition that controls whether an information item is included in a non-video coding layer track of the visual media file, and wherein a presence of the non-video coding layer track in the visual media file is indicated by a specific track reference in a video coding layer track of the visual media file.

Technique 2. The method of technique 1, wherein the condition specifies that the non-video coding layer track includes only non-video coding layer network abstraction layer units as the information item.

Technique 3. The method of any of techniques 1-2, wherein the condition specifies that the non-video coding layer track includes adaptation parameter sets as the information item, wherein the adaptation parameter sets include adaptive loop filter parameters, luma mapping with chroma scaling parameters, or scaling list parameters, and wherein the condition specifies that the adaptation parameter sets are stored in and transmitted through a track that is separate from another track that includes video coding layer network abstraction layer units.

Technique 4. The method of technique 3, wherein the condition allows the non-video coding layer track to additionally include other types of non-video coding layer network abstraction layer units.

Technique 5. The method of technique 3, wherein the condition disallows the non-video coding layer track to additionally include other types of non-video coding layer network abstraction layer units.

Technique 6. The method of any of techniques 1-2, wherein the condition specifies that the non-video coding layer track includes picture header network abstraction layer units as the information item, and wherein the condition specifies that the picture header network abstraction layer units are stored in and transmitted through a track that is separate from another track that includes video coding layer network abstraction layer units.

Technique 7. The method of technique 6, wherein the condition allows the non-video coding layer track to additionally include other types of non-video coding layer network abstraction layer units.

Technique 8. The method of technique 6, wherein the condition disallows the non-video coding layer track to additionally include other types of non-video coding layer network abstraction layer units.

Technique 9. The method of technique 6, wherein the condition allows the non-video coding layer track to additionally include adaptation parameter set network abstraction layer units.

Technique 10. The method of technique 6, wherein the condition disallows the non-video coding layer track to additionally include adaptation parameter set network abstraction layer units.

Technique 11. The method of any of techniques 1-2, wherein the condition specifies that picture header network abstraction layer units for a video stream is the information item that is stored either in a first set of samples of tracks containing video coding layer network abstraction layer units or in a second set of samples of non-video coding layer tracks but not both at a same time.

Technique 12. The method of any of techniques 1-11, wherein the conversion comprises generating the visual media file and storing the bitstream to the visual media file according to the format rule.

Technique 13. The method of any of techniques 1-11, wherein the conversion comprises generating the visual media file, and the method further comprises storing the visual media file in a non-transitory computer-readable recording medium.

Technique 14. The method of any of techniques 1-11, wherein the conversion comprises parsing the visual media file according to the format rule to reconstruct the bitstream.

Technique 15. The method any of techniques 1 to 14, wherein the visual media file is processed by a versatile video coding (VVC), and wherein the non-video coding layer track or the video coding layer track is a VVC track.

Technique 16. An apparatus for processing visual media data comprising a processor and a non-transitory memory with instructions thereon, wherein the instructions upon execution by the processor, cause the processor to implement a method recited in any one or more of techniques 1 to 15.

Technique 17. A non-transitory computer-readable storage medium storing instructions that cause a processor to implement a method recited in any one or more of techniques 1 to 15.

Technique 18. A video decoding apparatus comprising a processor configured to implement a method recited in one or more of techniques 1 to 15.

Technique 16. A video encoding apparatus comprising a processor configured to implement a method recited in one or more of techniques 1 to 15.

Technique 17. A computer program product having computer code stored thereon, the code, when executed by a processor, causes the processor to implement a method recited in any of techniques 1 to 15.

Technique 18. A computer readable medium on which a visual media file complying to a file format that is generated according to any of techniques 1 to 15.

Technique 19. A non-transitory computer-readable recording medium storing a bitstream of a visual media file which is generated by a method performed by a video processing apparatus, wherein the method is recited in any of techniques 1 to 15.

Technique 20. A method of visual media file generation, comprising:generating a visual media file according to a method recited in any of techniques 1 to 15, and storing the visual media file on a computer-readable program medium.

Figure 9:
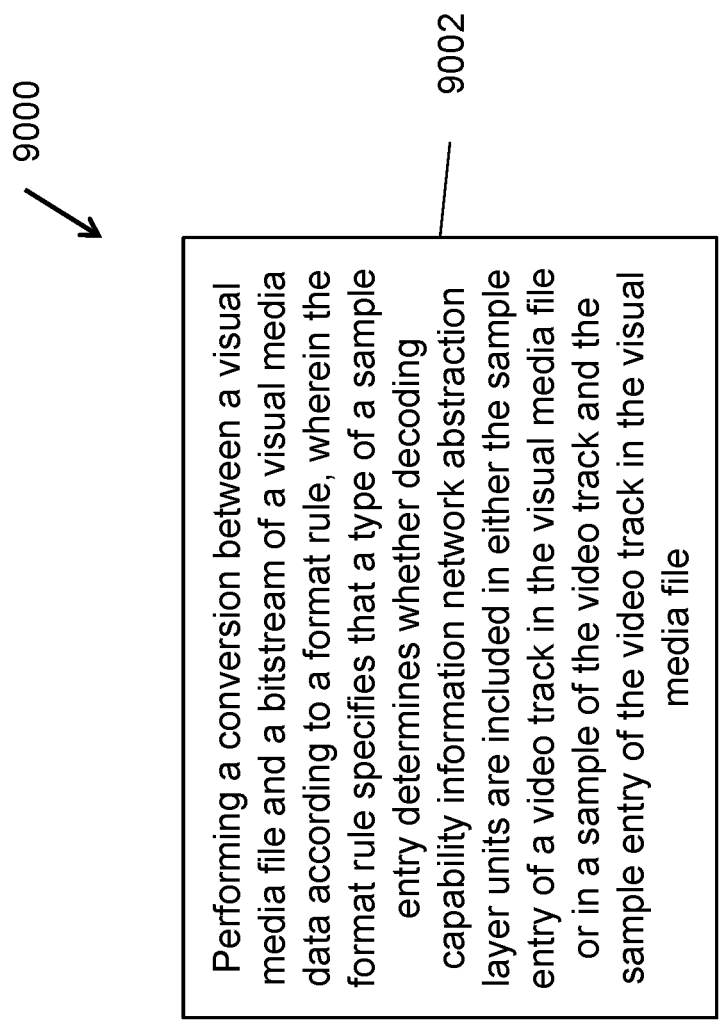

Implementation 1. A method of processing visual media data (e.g., method 9000 depicted in FIG. 9), comprising: performing (9002) a conversion between a visual media file and a bitstream of a visual media data according to a format rule, wherein the format rule specifies that a type of a sample entry determines whether decoding capability information network abstraction layer units are included in either the sample entry of a video track in the visual media file or in a sample of the video track and the sample entry of the video track in the visual media file.

Implementation 2. The method of claim 1, wherein the format rule specifies that the decoding capability information network abstraction layer units are included in the sample entry of the video track in response to the type of the sample entry being vvc1.

Implementation 3. The method of implementation 1, wherein the format rule specifies that the decoding capability information network abstraction layer units are included in the sample of the video track and the sample entry of the video track in response to the type of the sample entry being vvi1.

Implementation 4. The method of implementation 1, wherein the format rule specifies that a video elementary stream in the visual media file includes video coding layer network abstraction layer units, wherein the format rule specifies that the video elementary stream in the visual media file is disallowed from including a parameter set or the decoding capability information network abstraction units, and wherein the format rule specifies that sample entries in the visual media file store the parameter set and the decoding capability information network abstraction units.

Implementation 5. The method of implementation 4, wherein the format rule specifies that the video elementary stream in the visual media file is disallowed from including the parameter set, the decoding capability information network abstraction units, or operating point information network abstraction units, and wherein the format rule specifies that sample entries in the visual media file store the parameter set, the decoding capability information network abstraction units, and the operating point information network abstraction units.

Implementation 6. A method of processing visual media data, comprising: performing a conversion between a visual media file and a bitstream of a visual media data according to a format rule, wherein the format rule specifies that samples in the visual media file are allowed to belong to a same decoder capability information sample group in response to the samples belonging to multiple versatile video coding bitstreams and in response to the samples being included in a same track, and wherein the format rule specifies that all samples belonging to the same decoder capability information sample group share a same decoder capability information sample group description entry. In some embodiments the format rule specifies that samples in the visual media file are allowed to belong to a same decoder capability information sample group in response to the samples belonging to multiple versatile video coding bitstreams and in response to the samples being included in a same track, and wherein the format rule specifies that all samples belonging to the same decoder capability information sample group share a same decoder capability information sample group description entry.

Implementation 7. The method of implementation 6, wherein the format rule specifies that decoding capability information network abstraction layer units are indicated in a track level box in the visual media file in response to all samples of a track belonging to a same bitstream or in response to all samples sharing a same decoding capability information regardless of a number of bitstreams. In some embodiments, the format rule specifies that the decoding capability information network abstraction layer units are indicated in a track level box in the visual media file in response to all samples of a track belonging to a same bitstream or in response to all samples sharing a same decoding capability information regardless of a number of bitstreams.

Implementation 8. The method of claim 7, wherein the track level box is a track header box, a track level meta box, or another track level box.

Implementation 9. A method of processing visual media data, comprising:performing a conversion between a visual media file and a bitstream of a visual media data according to a format rule, wherein the format rule specifies that operating point information network abstraction layer units are allowed to be included in the visual media file in a sample entry description as one of a plurality of non-video coding layer network abstraction layer unit arrays in a decoder configuration record. In some embodiments, the format rule specifies that operating point information network abstraction layer units are allowed to be included in the visual media file in a sample entry description as one of a plurality of non-video coding layer network abstraction layer unit arrays in a decoder configuration record.

Implementation 10. A visual media processing method, comprising: performing a conversion between a visual media file and a bitstream of a visual media data according to a format rule, wherein the format rule specifies that a type of a sample entry determines whether operating point information network abstraction layer units are included in either: (1) the sample entry of the video track in the visual media file, or (2) either a sample of the video track in the visual media file or the sample entry of the video track in the visual media file or both. In some embodiments, the format rule specifies that a second type of a second sample entry determines whether operating point information network abstraction layer units are included in either: (1) the second sample entry of the video track in the visual media file, or (2) either a sample of the video track in the visual media file or the second sample entry of the video track in the visual media file or both.

Implementation 11. The method of implementation 10, wherein the format rule specifies that the operating point information network abstraction layer units are included in the sample entry of the video track in response to the type of the sample entry being vvc1. In some embodiments, the format rule specifies that the operating point information network abstraction layer units are included in the second sample entry of the video track in response to the second type of the second sample entry being vvc1.

Implementation 12. The method of implementation 10, wherein the format rule specifies that the operating point information network abstraction layer units are included in either the sample of the video track or the sample entry of the video track or both in response to the type of the sample entry being vvi1. In some embodiments, the format rule specifies that the operating point information network abstraction layer units are included in either the sample of the video track or the second sample entry of the video track or both in response to the second type of the second sample entry being vvi1.

Implementation 13. A method of processing visual media data, comprising: performing a conversion between a visual media file and a bitstream of a visual media data according to a format rule, wherein the format rule specifies that a non-video coding layer elementary stream in the visual media file is disallowed from including video coding layer network abstraction layer units, and wherein the format rule specifies that the non-video coding layer network abstraction layer units are synchronized with an elementary stream carried in a video track. In some embodiments, the format rule specifies that a non-video coding layer elementary stream in the visual media file is disallowed from including video coding layer network abstraction layer units, and wherein the format rule specifies that non-video coding layer network abstraction layer units are synchronized with an elementary stream carried in a video track.

Implementation 14. The method of any of implementations 1-13, wherein the conversion comprises generating the visual media file and storing the bitstream to the visual media file according to the format rule.

Implementation 15. The method of any of implementations 1-13, wherein the conversion comprises generating the visual media file, and the method further comprises storing the visual media file in a non-transitory computer-readable recording medium.

Implementation 16. The method of any of implementations 1-13, wherein the conversion comprises parsing the visual media file according to the format rule to reconstruct the bitstream.

Implementation 17. The method any of implementations 1 to 16, wherein the visual media file is processed by a versatile video coding (VVC), and the video track is VVC track.

Implementation 18. An apparatus for processing visual media data comprising a processor and a non-transitory memory with instructions thereon, wherein the instructions upon execution by the processor, cause the processor to implement a method recited in one or more of implementations 1 to 17.

Implementation 19. A non-transitory computer-readable storage medium storing instructions that cause a processor to implement a method recited in any of implementations 1 to 17.

Implementation 20. A video decoding apparatus comprising a processor configured to implement a method recited in one or more of implementations 1 to 17.

Implementation 21. A video encoding apparatus comprising a processor configured to implement a method recited in one or more of implementations 1 to 17.

Implementation 22. A computer program product having computer code stored thereon, the code, when executed by a processor, causes the processor to implement a method recited in any of implementations 1 to 17.

Implementation 23. A computer readable medium on which a visual media file complying to a file format that is generated according to any of implementations 1 to 17.

Implementation 24. A non-transitory computer-readable recording medium storing a bitstream of a visual media file which is generated by a method performed by a video processing apparatus, wherein the method is recited in any of implementations 1 to 17.

Implementation 25. A method of visual media file generation, comprising: generating a visual media file according to a method recited in any of implementations 1 to 17, and storing the visual media file on a computer-readable program medium.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing visual media data, comprising:
performing a conversion between a visual media file and a bitstream of a visual media data according to a format rule,
wherein the format rule specifies a condition that controls whether an information item is included in a non-video coding layer track of the visual media file,
wherein a presence of the non-video coding layer track in the visual media file is indicated by a specific track reference in a video coding layer track of the visual media file, and
wherein the condition specifies that picture header network abstraction layer units for a video stream is the information item that is stored either in a first set of samples of tracks containing video coding layer network abstraction layer units or in a second set of samples of non-video coding layer tracks but not both at a same time.

2. The method of claim 1,
wherein the condition specifies that the non-video coding layer track includes only non-video coding layer network abstraction layer units as the information item.

3. The method of claim 1,
wherein the condition specifies that the non-video coding layer track includes adaptation parameter sets as the information item,
wherein the adaptation parameter sets include adaptive loop filter parameters, luma mapping with chroma scaling parameters, or scaling list parameters, and
wherein the condition specifies that the adaptation parameter sets are stored in and transmitted through a track that is separate from another track that includes the video coding layer network abstraction layer units.

4. The method of claim 3, wherein the condition allows the non-video coding layer track to additionally include other types of non-video coding layer network abstraction layer units.

5. The method of claim 3, wherein the condition disallows the non-video coding layer track to additionally include other types of non-video coding layer network abstraction layer units.

6. The method of claim 1,
wherein the condition specifies that the non-video coding layer track includes the picture header network abstraction layer units as the information item, and
wherein the condition specifies that the picture header network abstraction layer units are stored in and transmitted through a track that is separate from another track that includes the video coding layer network abstraction layer units.

7. The method of claim 6, wherein the condition allows the non-video coding layer track to additionally include other types of non-video coding layer network abstraction layer units.

8. The method of claim 6, wherein the condition disallows the non-video coding layer track to additionally include other types of non-video coding layer network abstraction layer units.

9. The method of claim 6, wherein the condition allows the non-video coding layer track to additionally include adaptation parameter set network abstraction layer units.

10. The method of claim 6, wherein the condition disallows the non-video coding layer track to additionally include adaptation parameter set network abstraction layer units.

11. The method of claim 1, wherein the conversion comprises generating the visual media file and storing the bitstream to the visual media file according to the format rule.

12. The method of claim 1, wherein the conversion comprises parsing the visual media file according to the format rule to reconstruct the bitstream.

13. An apparatus for processing visual media data comprising a processor and a non-transitory memory with instructions thereon, wherein the instructions upon execution by the processor, cause the processor to:
perform a conversion between a visual media file and a bitstream of a visual media data according to a format rule,
wherein the format rule specifies a condition that controls whether an information item is included in a non-video coding layer track of the visual media file, and
wherein a presence of the non-video coding layer track in the visual media file is indicated by a specific track reference in a video coding layer track of the visual media file, and
wherein the condition specifies that picture header network abstraction layer units for a video stream is the information item that is stored either in a first set of samples of tracks containing video coding layer network abstraction layer units or in a second set of samples of non-video coding layer tracks but not both at a same time.

14. The apparatus of claim 13,
wherein the condition specifies that the non-video coding layer track includes only non-video coding layer network abstraction layer units as the information item.

15. The apparatus of claim 13,
wherein the condition specifies that the non-video coding layer track includes adaptation parameter sets as the information item,
wherein the adaptation parameter sets include adaptive loop filter parameters, luma mapping with chroma scaling parameters, or scaling list parameters, and
wherein the condition specifies that the adaptation parameter sets are stored in and transmitted through a track that is separate from another track that includes the video coding layer network abstraction layer units.

16. The apparatus of claim 15, wherein the condition allows or disallows the non-video coding layer track to additionally include other types of non-video coding layer network abstraction layer units.

17. The apparatus of claim 13,
wherein the condition specifies that the non-video coding layer track includes the picture header network abstraction layer units as the information item, and
wherein the condition specifies that the picture header network abstraction layer units are stored in and transmitted through a track that is separate from another track that includes the video coding layer network abstraction layer units.

18. The apparatus of claim 17, wherein the condition allows the non-video coding layer track to additionally include other types of non-video coding layer network abstraction layer units.

19. A non-transitory computer-readable storage medium storing instructions that cause a processor to:
perform a conversion between a visual media file and a bitstream of a visual media data according to a format rule,
wherein the format rule specifies a condition that controls whether an information item is included in a non-video coding layer track of the visual media file,
wherein a presence of the non-video coding layer track in the visual media file is indicated by a specific track reference in a video coding layer track of the visual media file, and
wherein the condition specifies that picture header network abstraction layer units for a video stream is the information item that is stored either in a first set of samples of tracks containing video coding layer network abstraction layer units or in a second set of samples of non-video coding layer tracks but not both at a same time.

20. A non-transitory computer-readable recording medium storing a bitstream of a visual media data which is generated by a method performed by a video processing apparatus, wherein the method comprises:
generating the bitstream of the visual media data according to a format rule,
wherein the format rule specifies a condition that controls whether an information item is included in a non-video coding layer track of a visual media file,
wherein a presence of the non-video coding layer track in the visual media file is indicated by a specific track reference in a video coding layer track of the visual media file, and
wherein the condition specifies that picture header network abstraction layer units for a video stream is the information item that is stored either in a first set of samples of tracks containing video coding layer network abstraction layer units or in a second set of samples of non-video coding layer tracks but not both at a same time.

* * * * *